United States Patent [19]
Aramaki

[11] Patent Number: 5,864,553
[45] Date of Patent: Jan. 26, 1999

[54] MULTIPORT FRAME EXCHANGE SYSTEM

[75] Inventor: Toshiya Aramaki, Tokyo, Japan

[73] Assignee: NEC Corporation, Tokyo, Japan

[21] Appl. No.: 780,468

[22] Filed: Jan. 8, 1997

[30] Foreign Application Priority Data

Jan. 10, 1996 [JP] Japan .................................. 8-002242

[51] Int. Cl.⁶ .................................................. H04L 12/56
[52] U.S. Cl. ........................ 370/392; 370/413; 370/422
[58] Field of Search ................................... 370/389, 390,
370/392, 393, 398, 401, 409, 410, 412,
413, 415, 417, 422, 423, 424, 426, 427,
428, 429; 395/872, 881

[56] References Cited

U.S. PATENT DOCUMENTS

| | | | |
|---|---|---|---|
| 4,947,388 | 8/1990 | Kuwahara et al. | 370/411 |
| 5,483,521 | 1/1996 | Aramaki | 370/396 |
| 5,513,172 | 4/1996 | Shikama et al. | 370/428 |
| 5,610,914 | 3/1997 | Yamada | 370/395 |
| 5,649,217 | 7/1997 | Yamanaka et al. | 395/872 |
| 5,710,770 | 1/1998 | Kozaki et al. | 370/368 |

FOREIGN PATENT DOCUMENTS 4-108242  4/1992  Japan .

OTHER PUBLICATIONS

"Fast Ethernet/Ethernet Switch Engine Chip Set with ATM Uplink", MMC Networks, (Sep. 1996), pp. 2–8.

*Primary Examiner*—Chi H. Pham
*Assistant Examiner*—Kwang B. Yao
*Attorney, Agent, or Firm*—Foley & Lardner

[57] ABSTRACT

A multiport frame exchange system is disclosed having a plurality of input and output lines and which outputs frame data inputted from these input and output lines to desired input and output lines based on frame header information. This multiport frame exchange system is composed of input frame buffers provided for each input line that store inputted frames; output frame buffers provided for each output line that store and output output frames; a header processor that processes the headers of frames; and a self-routing section that connects the input frame buffers, the output frame buffers, and the header processor.

7 Claims, 6 Drawing Sheets

MULTIPORT FRAME EXCHANGE SYSTEM

BACKGROUND OF THE INVENTION

1. Field of the Invention

The present invention relates to a multiport frame exchange system having a plurality of input lines and a plurality of output lines wherein frame data inputted from the plurality of input lines are outputted to desired output lines based on the header information of the frames.

2. Description of the Related Art

With the growing number of client/server systems configured for in-house networks and LANs and with the increasing volume of data handled by these systems including audio information, still pictures, and moving pictures, increasing attention has been focused on the technology of structuring these networks. Frame exchange devices having a plurality of input and output ports have come into use for constructing these types of networks. The frames dealt with include MAC (Media Access Control) frames handled on the MAC layer or IP (Internet Protocol) packets handled on the network layer.

Figure 1:
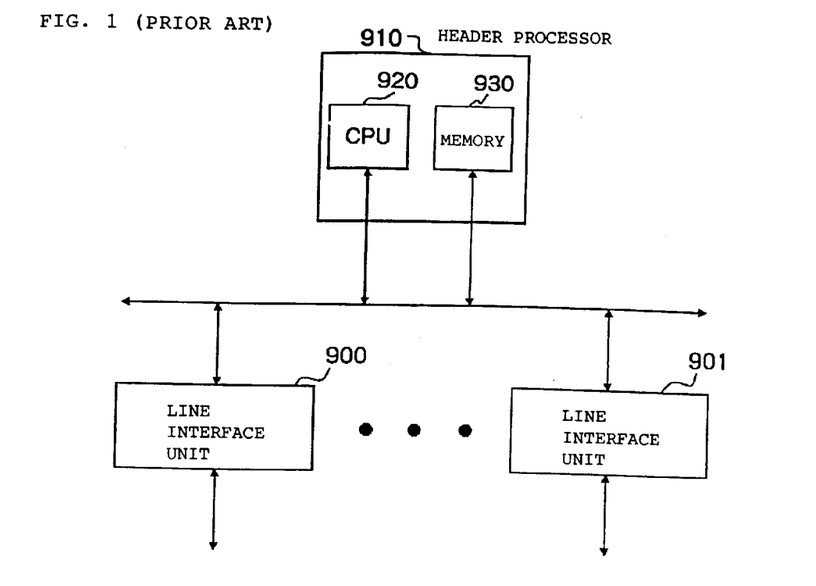
FIG. 1 shows the construction of a multiport frame exchange system according to a first example of the prior art.

In such devices, header processing is executed within, for example, a CPU, and takes on a construction such as shown in FIG. 1. In this construction, frames inputted to line interface unit 900 are sent to memory 930 of header processor 910, and following execution of address processing at CPU 920, are sent to line interface unit 901, which is connected to the line of the output destination. Data transfer at this time is carried out using a common bus, and moreover, access of memory 930 during processing by CPU 920 is also achieved using this bus. As a consequence, use of this bus by a particular line interface unit prevents use by another line interface unit or by CPU 920, thereby interfering with application to high-speed lines or the accommodation of a large number of lines.

Figure 2:
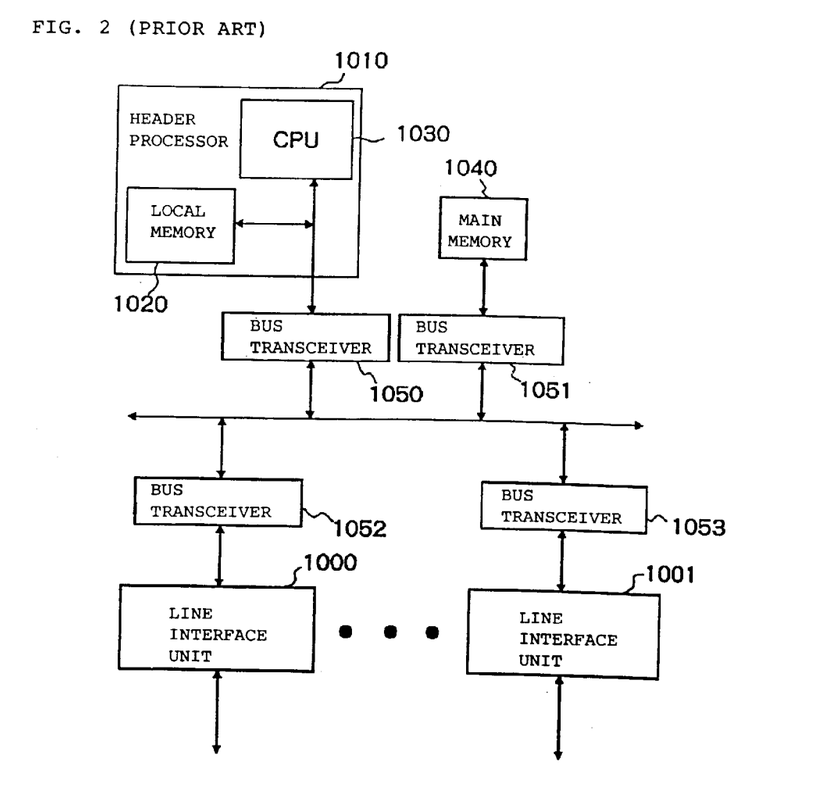
FIG. 2 shows the construction of a multiport frame exchange system according to a second example of the prior art.

As one data transfer system directed toward improving this situation, Japanese Patent Laid-open No. 108242/92 proposes the structure shown in FIG. 2. In this system, header information including, for example, the frame destination, is stored in local memory 1020 of header processor 1010 while the data section of the frame is stored in main memory 1040; and at the time of frame transmission, line interface units 1000 and 1001 operate by accessing data in main memory 1040 and accessing header information in local memory 1020 by way of bus transceivers 1050–1053. In this way, header processing can be performed without monopolizing the common bus, thereby increasing opportunities of data transmission and raising throughput. However, line interface units 1000 and 1001 both share use of the common bus for data transmission, and as a result, high-speed lines and accommodation of a large number of lines cannot be fully implemented.

In the above-described systems of the prior art, data transmission is effected over a common bus, and as a consequence, full implementation of high-speed lines and the accommodation of multiple lines is compromised.

SUMMARY OF THE INVENTION

The object of the present invention is to provide a high-performance multiport frame exchange system that solves the above-described problems of the prior art, that realizes data transmission through a self-routing switched network, that can simultaneously execute a plurality of data, and moreover, that can be applied to high-speed lines and the accommodation of multiple lines by enabling the parallel operation of processing and header processing for each line.

To achieve the above-described object, a multiport frame exchange system according to the present invention is made up of: input frame buffer means provided corresponding to input lines; output frame buffer means provided corresponding to output lines; header processing means that executes processing based on header information of the frames; and self-routing means having inputs connected to the outputs of the input frame buffer means and to the outputs of the header processing means, and having outputs connected to the inputs of the output frame buffer means and to the inputs of the header processing means; wherein:

the input frame buffer means includes means for storing frames inputted from the input lines; and means that copies header information of the stored frames, that appends to it output port information indicating the position of the header processing means, input port information indicating the position of the input frame buffer means, and frame identifiers that identifies the stored frames, and that outputs to the self-routing means;

the self-routing means includes: means for receiving from the input frame buffer means header information to which are been appended the output port information, input port information, and frame identifier; and means for outputting this information to the header processing means connected to the output port indicated by the output port information;

the header processing means includes means for receiving from the self-routing means header information to which have been appended the output port information, the input port information, and the frame identifiers; and means for carrying out processing based on this header information, generating output line information indicating the desired output lines of frames having the header information, generating output port information indicating the position of the input frame buffer means for echoing back the header information from input port information appended to the header information, appending to the output line information input port information indicating the position of the header processing means, the output port information, and frame identifiers that have been appended to the header information, and outputting the result to the self-routing means;

the self-routing means includes means for receiving output line information to which have been appended the output port information, the input port information, and the frame identifiers; and means for outputting this information to the input frame buffer means connected to output ports indicated by the output port information;

the input frame buffer means includes means for receiving from the self-routing means output line information to which have been appended the output port information, the input port information, and the frame identifiers; means for detecting frames indicated by the frame identifiers, and generating output port information indicating the output frame buffer means which is the output destination of frames judged from the frame identifiers from the output line information; and means for appending to frames judged from the frame identifiers the output port information, input port information indicating the position of the input frame buffer means, and the frame identifiers, and outputting the result to the self-routing means;

the self-routing means includes means for receiving frames to which are appended the output port information, the input port information, and the frame identifiers; and means for outputting this information to the output frame buffer means connected to output ports indicated by the output port information; and the output frame buffer means includes means for receiving, storing, and outputting to output lines frames to which have been appended the output port information and input port information.

By transmitting frames and header information through the use of this self-routing means, transmission of each can be carried out in parallel, and moreover, transmission of data can be carried out parallel with header processing.

According to an embodiment of the present invention, the input frame buffer means divides frames such that the data length of frames outputted from the input frame buffer means to which are appended output port information, input port information, and frame identifiers are of a fixed length including output port information; appends output port information to each of the divided frames; and outputs the result to the self-routing means.

According to another embodiment of the present invention, the data length of header information outputted from the input frame buffer means and to which have been appended the output port information, the input port information, and the frame identifiers; the data length of output line information outputted from the header processing means and to which have been appended the output port information, the input port information, and the frame identifiers; and the data length of divided frames outputted from the input frame buffer means that are outputted after appending the output port information, the input port information, and the frame identifiers; are each fixed; and moreover, the data length of each of the output port information, the input port information, and the frame identifiers that have been appended is also fixed.

Control of the self-routing means can be simplified by fixing the data length handled by the self-routing means.

According to another embodiment of the present invention, the input frame buffer means and the header processing means are connected to a bus; and the header information outputted from the input frame buffer means and to which have been appended output port information, input port information, and frame identifiers, is transmitted by way of said bus.

According to another embodiment of the present invention, the input frame buffer means, the header processing means, and output frame buffer means are connected to a bus; and output line information outputted from the header processing means and to which have been appended output port information, input port information and frame identifiers is received and transmitted by way of the bus.

According to another embodiment of the present invention, the input frame buffer means and header processing means are connected by multiple circuits; and output port information outputted from the input frame buffer means is transmitted to the header processing means by way of these multiple circuits.

According to yet another embodiment of the present invention, the output frame buffer means and header processing means are connected by isolated circuits, and output line information outputted from the header processing means is transmitted to the output frame buffer means over the isolated circuits.

Transmitting and receiving header information separate from frame transmission using a bus, multiple circuits or isolated circuits allows a reduction in the number of input/output ports of the self-routing means as well as a simplification of the control of the self-routing means.

The above and other objects, features, and advantages of the present invention will become apparent from the following description with references to the accompanying drawings which illustrate examples of the present invention.

DETAILED DESCRIPTION OF THE PREFERRED EMBODIMENTS

In the following descriptions, it is assumed that each of embodiments has two input ports and two output ports unless otherwise stated.

Figure 3:
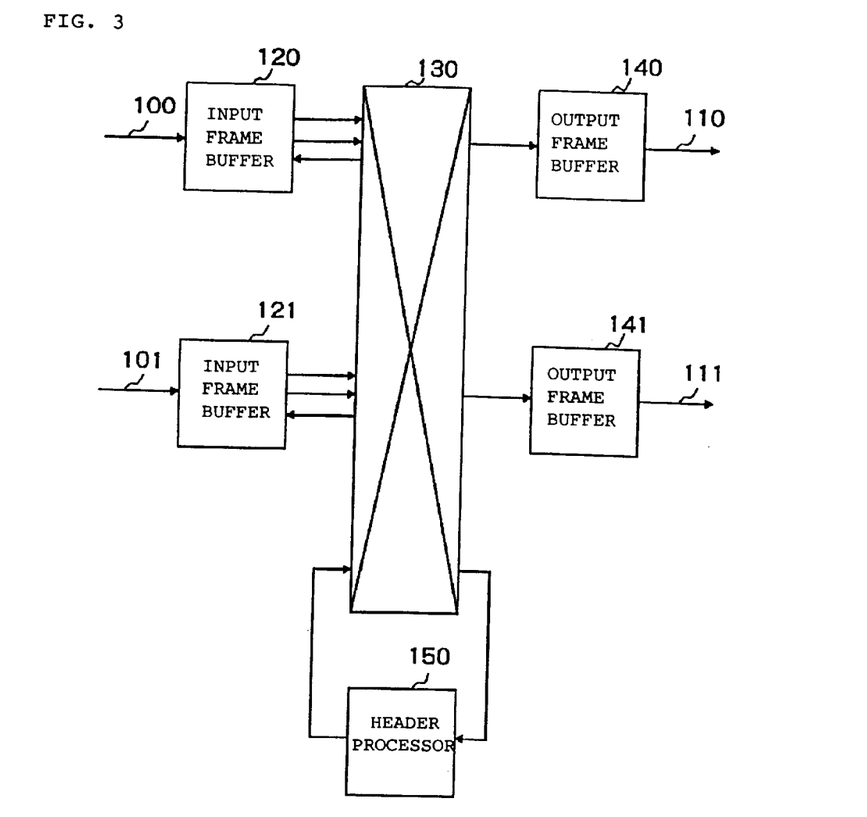
FIG. 3 shows the construction of a multiport frame exchange system according to the first embodiment of the present invention.

Referring to FIG. 3, the multiport exchange system according to the first embodiment of the present invention is made up of: input lines 100 and 101 by which frames are inputted; output lines 110 and 111 by which frames are outputted; input frame buffers 120 and 121 provided corresponding to each input line 100 and 101 and having inputs connected to input lines 100 and 101, respectively; output frame buffers 140 and 141 provided corresponding to each output line 110 and 111 and having outputs connected to output lines 110 and 111, respectively; header processor 150 that processes frame headers; and self-routing section 130 having inputs connected to the outputs of input frame buffers 120 and 121 and the output of header processor 150, and having outputs connected to the inputs of output frame buffers 140 and 141 and the input of header processor 150.

Figure 4:
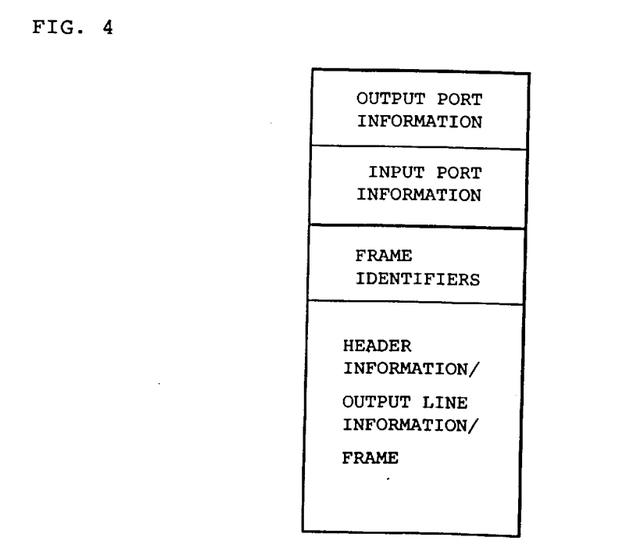
FIG. 4 shows the basic composition of data handled by self-routing section 130.

FIG. 4 shows the format of data outputted to self-routing section 130 from input frame buffers 120 and 121 and header processor 150. In some cases, frames are outputted from input frame buffers 120 and 121 after appending to the frame header information output port information indicating the position of header processor 150, input port information indicating the position of the input frame buffers themselves, and frame identifiers that identify the frames; while in other cases, frames are outputted after appending to the frames output port information indicating the position of output frame buffers 140 and 141 which are connected to desired output lines obtained from header processor 150, input port information indicating the positions of the input frame buffers 120 and 121 themselves, and frame identifiers that identify the frames. Header processor 150 outputs after appending to the output line information, which indicates the desired output line obtained from the header information of a frame, output port information indicating the positions of input frame buffers 120 and 121 in which the frames are stored and frame identifiers that identify the frames. Self-routing section 130 judges the desired output port from output port information and outputs data to the desired output ports.

Figure 5:
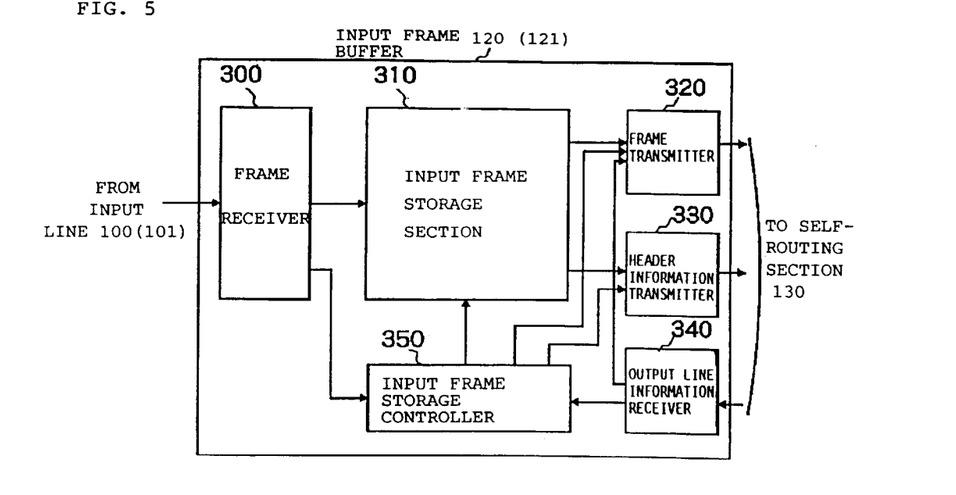
FIG. 5 shows the construction of input frame buffer sections 120 and 121.

FIG. 5 shows the construction of input frame buffers 120 and 121. Input frame buffer 120 (121) is made up of frame receiver 300 which is connected to input line 100 (101) and which performs reception control of frames inputted from input line 100 (101); input frame storage section 310 that stores frames received at frame receiver 300; header information transmitter 330 that appends to the header information of frames stored in input frame storage section 310 output port information, input port information indicating the position of the input frame buffer 120 (121) itself, and a frame identifier that identifies the frame, and outputs to self-routing section 130; output line information receiver 340 that receives output line information that is outputted from header processor 150 through the self-routing section 130 and to which has been appended output port information indicating the position of input frame buffer 120 (121) and a frame identifier that identifies the frame; frame transmitter 320 that appends to frames stored in input frame storage section 310 output line information received at output line information receiver 340, output port information, input port information indicating the position of input frame buffer 120 (121), and frame identifiers that identify the frames, and outputs to self-routing section 130; and input frame storage controller 350 that controls storage of frames to input frame storage section 310 and output of frames from input frame storage section 310 based on the frame reception information of frame receiver 300 and the frame identifiers of output line information receiver 340.

Figure 6:
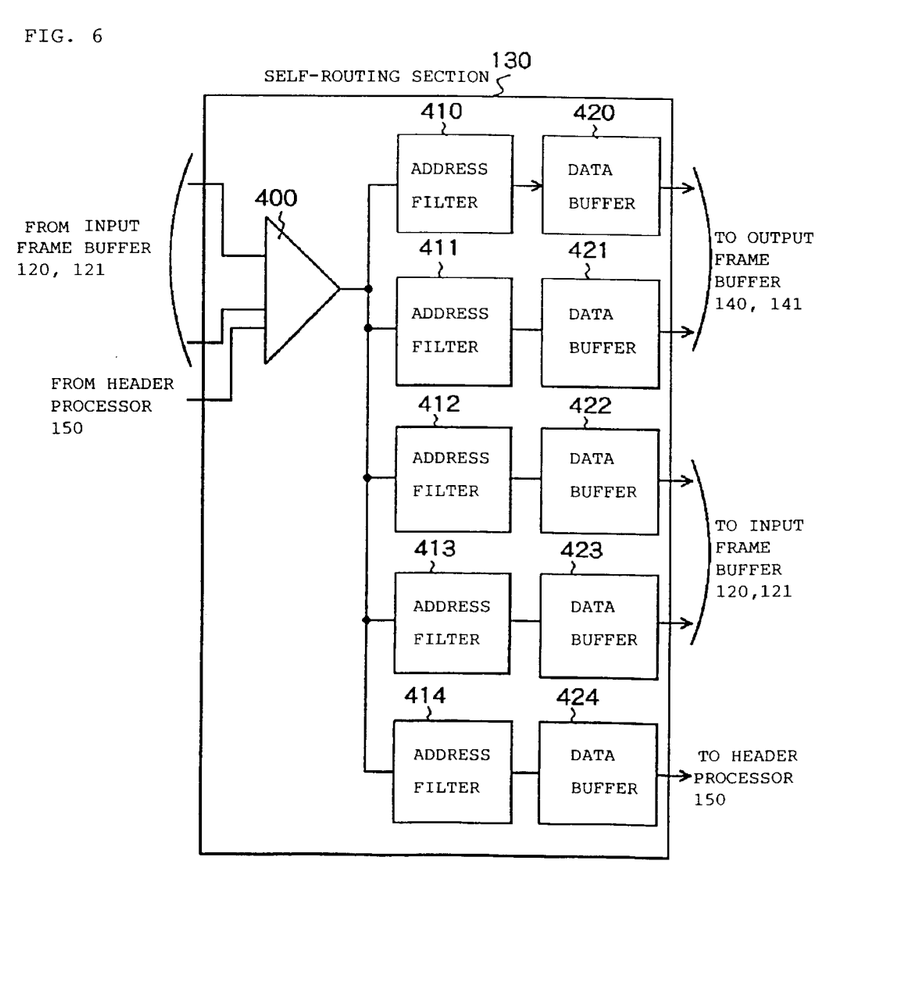
FIG. 6 shows the construction of self-routing section 130.

FIG. 6 shows the construction of self-routing section 130. Self-routing section 130 is made up of: data time division multiplexer 400 that is connected to input frame buffers 120 and 121, output frame buffers 140 and 141, and header processor 150, and that time-division-multiplexes data inputted from input frame buffers 120 and 121 and header processor 150; address filters 410, 411, 412, 413, and 414 that are each connected to data time division multiplexer 400, that each detect output port information of data outputted from data time division multiplexer 400, receive the data if the output destination indicated in this output port information, and discard the data if not the output destination; and data buffers 420, 421, 422, 423, and 424 that store data outputted from address filters 410, 411, 412, 413, and 414 and output data according to the order stored. The self-routing section 130 shown in FIG. 6 is of a construction having data buffers on the output side, but may also have the construction of other known self-routing exchange circuits, such as a construction having data buffers on the input side, or a construction in which an output side data buffer is shared.

Figure 7:
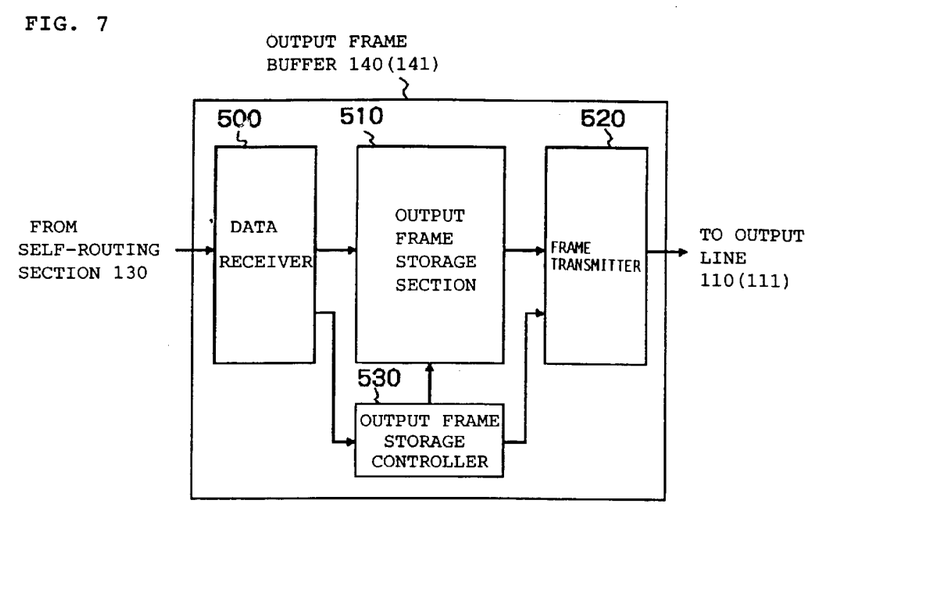
FIG. 7 shows the construction of output frame buffers 140 and 141.

FIG. 7 shows the construction of output frame buffers 140 and 141. Output frame buffer 140 (141) is made up of: data receiver 500 that is connected to self-routing section 130, receives data from self-routing section 130, extracts frame information from received data, and detects frame identifiers and input port information of the data; output frame storage section 510 that stores frame information extracted at data receiver 500; frame transmitter 520 that outputs frames stored in output frame storage section 510 to output ports; and output frame storage controller 530 that controls storage of frames to output frame storage section 510 and output of frames from output frame storage section 510 to frame transmitter 520 based on input port information and data frame identifiers from data receiver 500.

Figure 8:
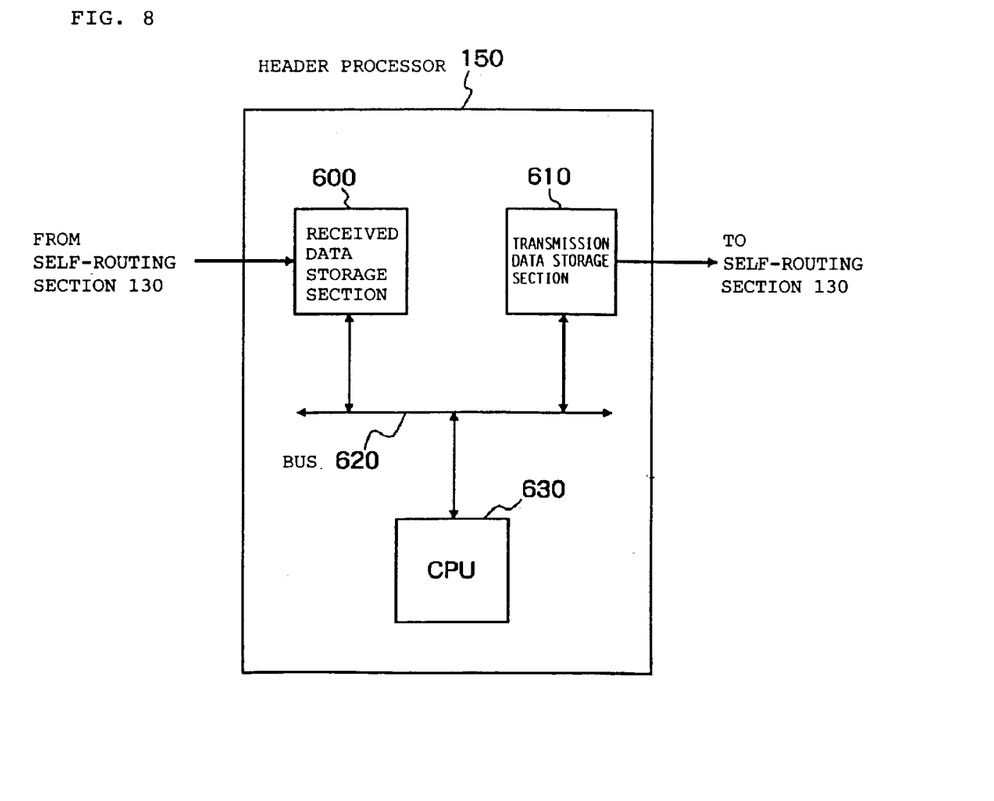
FIG. 8 shows the construction of header processor 150.

FIG. 8 shows the construction of header processor 150. Header processor 150 is made up of: received data storage section 600 that is connected to self-routing section 130 and that receives and stores data from self-routing section 130; CPU 630 that detects output line information of frames based on header information of frames within data stored in received data storage section 600, appends to detected output line information, as output port information, input port information within data including header information which was the basis of this output line information, and moreover, appends input port information of header processor 150 and frame identifiers within the same data, and performs other header processing; and transmission data storage section 610 that stores output line information to which are appended the above-described output port information, frame identifiers, and input port information, and outputs to self-routing section 130.

The above-described construction enables frame transmission between lines and data transmission for address processing by the self-routing exchange network, and moreover, because the bus to which the CPU is connected is not monopolized by frame transmission, enables high-speed lines and the accommodation of multiple lines.

Use of a fixed data length for output port information, input port information, and frame identifiers in the data shown in FIG. 4 that are handled by self-routing section 130, and moreover, use of a fixed data length for address information from inputted frames, output line information from header processor 150, and frames from input frame buffers 120 and 121 enables high-speed operation of self-routing section 130, such as an ATM (Asynchronous Transfer Mode) exchange circuit that handles cells of fixed length. In such a case, if a frame length is used in transmitting to self-routing section 130 that is shorter than frames connected to input frame buffers 120 and 121, the frames are divided into fixed length, output port information, input port information, and frame identifiers are appended to each divided frame, and the result is transmitted.

Figure 9:
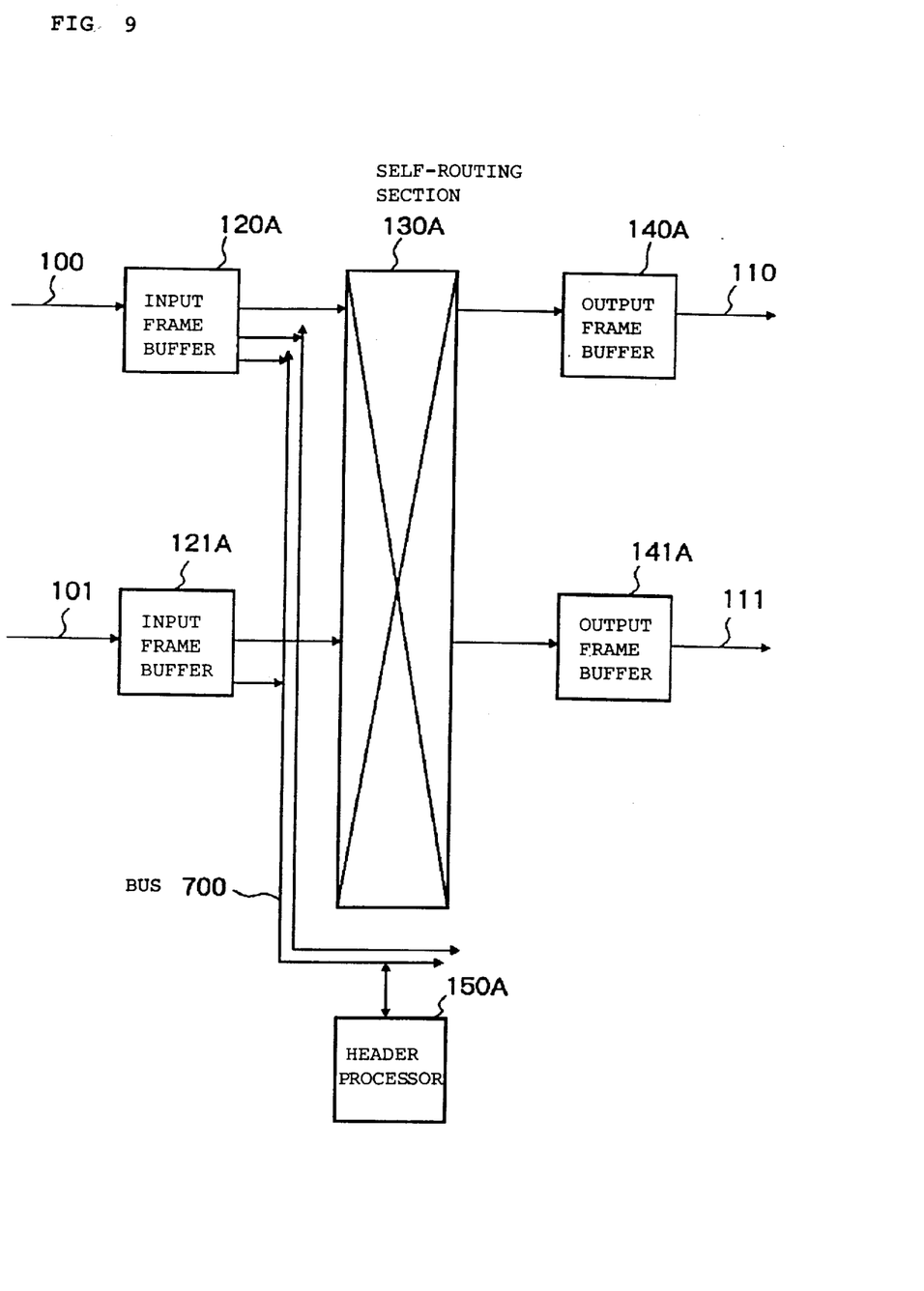
FIG. 9 shows the construction of the multiport exchange system according to the second embodiment of the present invention.

Referring to FIG. 9, in the multiport frame exchange system according to the second embodiment of the present invention, transmission of address information between header processor 150A and input frame buffers 120A and 121A passes by way of bus 700 instead of through self-routing section 130A. In this case, output frame buffers 140A and 141A are connected to output lines 110 and 111, respectively.

Figure 10:
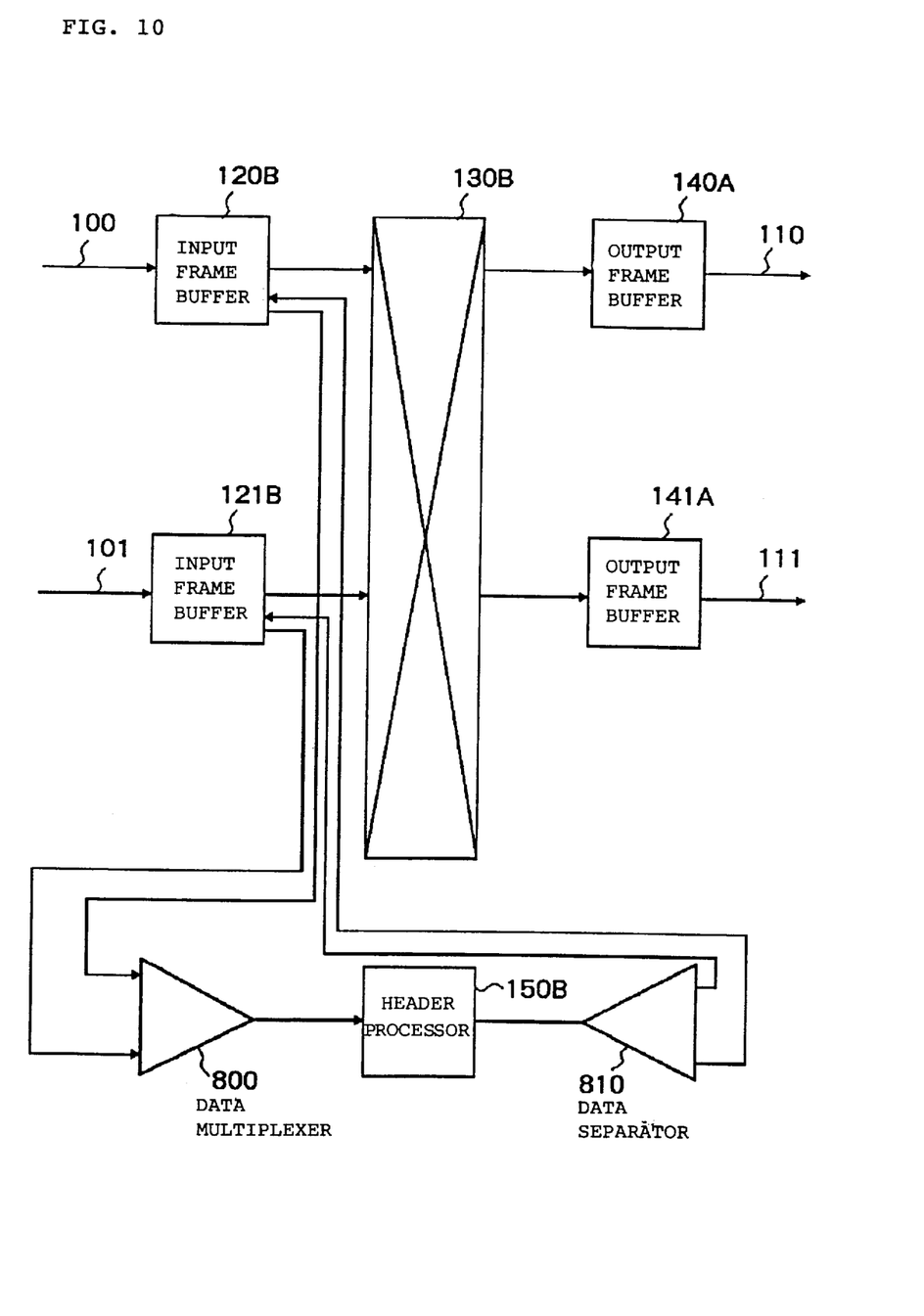
FIG. 10 shows the construction of the multiport exchange system according to the third embodiment of the present invention.

Referring to FIG. 10, in the multiport frame exchange system according to the third embodiment of the present invention, transmission of address information between header processor 150B and input frame buffers 120B and 121B passes by way of data multiplexer 800 and data separator 810 instead of through self-routing section 130B. The number of input/output ports of the self-routing section can thus be decreased compared to self-routing sections 130A and 130B, and the circuit can be simplified.

While preferred embodiments of the present invention have been described using specific terms, such description is for illustrative purposes only, and it is to be understood that changes and variations may be made without departing from the spirit of scope of the following claims.

What is claimed is:

1. A multiport frame exchange system having a plurality of input and output lines wherein frame data inputted from said plurality of input and output lines are outputted to desired input and output lines based on header information of frames; comprising:

input frame buffer means provided corresponding to said input lines; output frame buffer means provided corresponding to said output lines; header processing means that executes processing based on said header information of frames; and self-routing means having inputs connected to outputs of said input frame buffer means and to outputs of said header processing means, and having outputs connected to inputs of said output frame buffer means and to inputs of said header processing means; wherein:

said input frame buffer means comprises means for storing frames inputted from said input lines; and means that copies header information of said stored frames, that appends to said header information output port information indicating the position of said header processing means, input port information indicating the position of said input frame buffer means, and frame identifiers that identifies said stored frames, and that outputs to said self-routing means;

said self-routing means comprises means for receiving from said input frame buffer means header information to which have been appended said output port information, input port information, and frame identifiers; and means for outputting this information to said header processing means connected to an output port indicated by said output port information;

said header processing means comprises means for receiving from said self-routing means header information to which have been appended said output port information, said input port information, and said frame identifiers; means for carrying out processing based on said header information, generating output line information indicating desired output lines of frames having said header information, and generating output port information indicating the position of input frame buffer means for echoing back said header information from input port information appended to said header information; means for appending to said output line information input port information indicating the position of said header processing means, said output port information, and frame identifiers that have been appended to said header information, and outputting the result to said self-routing means;

said self-routing means comprises means for receiving output line information to which have been appended said output port information, said input port information, and said frame identifiers; and means for outputting this information to said input frame buffer means connected to output ports indicated by said output port information;

said input frame buffer means comprises means for receiving from said self-routing means output line information to which have been appended said output port information, said input port information, and said frame identifiers; means for detecting frames indicated by said frame identifiers, and generating output port information indicating said output frame buffer means which is the output destination of frames judged from said frame identifiers from said output line information; and means for appending to frames judged from said frame identifiers said output port information, input port information indicating the position of said input frame buffer means, and said frame identifiers, and outputting the result to said self-routing means;

said self-routing means comprises means for receiving frames to which have been appended said output port information, said input port information, and said frame identifiers; and means for outputting this information to said output frame buffer means connected to output ports indicated by said output port information; and said output frame buffer means comprises means for receiving frames to which have been appended said output port information and input information; and means for storing said frames and outputting to output lines.

2. A multiport frame exchange system according to claim 1 wherein said input frame buffer means comprises means for dividing frames such that the data length of frames outputted from said input frame buffer means to which are appended output port information, input port information, and frame identifiers, are of a fixed length including output port information; appending output port information to each of said divided frames, and outputting the result to said self-routing means.

3. A multiport frame exchange system according to claim 2 wherein: the data length of header information outputted from said input frame buffer means and to which have been appended said output port information, said input port information, and said frame identifiers; the data length of output line information outputted from said header processing means and to which have been appended said output port information, said input port information, and said frame identifiers; and the data length of divided frames outputted from said input frame buffer means that outputted after appending said output port information, said input port information, and said frame identifiers; are each fixed; and moreover, the data length of each of said output port information, said input port information, and said frame identifiers that have been appended is also fixed.

4. A multiport frame exchange system according to claim 1 wherein said input frame buffer means and said header processing means are connected to a bus; and header information outputted by said input frame buffer means and to which have been appended said output port information, said input port information, and said frame identifiers, is transmitted by way of said bus.

5. A multiport frame exchange system according to claim 1 wherein said input frame buffer means, said header processing means, and said output frame buffer means are connected to a bus; and output line information outputted from said header processing means and to which have been appended said output port information, said input port information, and said frame identifiers, is received and transmitted by way of said bus.

6. A multiport frame exchange system according to claim 1 wherein said input frame buffer means and said header processing means are connected by multiple circuits; and output port information outputted from said input frame buffer means is transmitted to said header processing means by way of said multiple circuits.

7. A multiport frame exchange system according to claim 1 wherein said output frame buffer means and said header processing means are connected by isolated circuits; and output line information outputted from said header processing means is transmitted to said output frame buffer means by way of said isolated circuits.

* * * * *